US 10,846,494 B2

(12) United States Patent
Bolton et al.

(10) Patent No.: US 10,846,494 B2
(45) Date of Patent: Nov. 24, 2020

(54) RADIO-FREQUENCY IDENTIFICATION DEVICE FOR INDICATING A TEMPERATURE HISTORY OF A COMPOSITE STRUCTURE

(71) Applicant: THE BOEING COMPANY, Chicago, IL (US)

(72) Inventors: Joseph Andrew Bolton, Newalla, OK (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 16/239,096

(22) Filed: Jan. 3, 2019

(65) Prior Publication Data

US 2020/0218861 A1 Jul. 9, 2020

(51) Int. Cl.
*G06K 7/10* (2006.01)
*G06K 19/077* (2006.01)
*H01Q 1/22* (2006.01)
*H01Q 9/06* (2006.01)

(52) U.S. Cl.
CPC ... *G06K 7/10316* (2013.01); *G06K 19/07773* (2013.01); *H01Q 1/22* (2013.01); *H01Q 1/2216* (2013.01); *H01Q 9/065* (2013.01)

(58) Field of Classification Search
CPC . G06K 7/10316; G06K 19/07773; H01Q 1/22
USPC ........................................................ 235/451
See application file for complete search history.

(56) References Cited

U.S. PATENT DOCUMENTS

| | | | |
|---|---|---|---|
| 5,677,484 A | 10/1997 | Stark | |
| 6,564,629 B2 | 5/2003 | Stark | |
| 7,719,404 B2 | 5/2010 | Makela et al. | |
| 8,468,680 B2 | 6/2013 | Joseph et al. | |
| 8,542,024 B2 | 9/2013 | Potyrailo et al. | |
| 8,994,528 B2 | 3/2015 | Celik-Butler et al. | |
| 10,119,867 B2 | 11/2018 | Egley et al. | |
| 10,142,718 B2 | 11/2018 | Vlinervini et al. | |
| 2006/0270189 A1 | 11/2006 | Ogita et al. | |
| 2010/0136252 A1 | 6/2010 | Kohnle et al. | |
| 2012/0051972 A1 | 3/2012 | Joseph | |
| 2016/0033403 A1* | 2/2016 | Packirisamy | G01N 21/554 422/69 |
| 2019/0118460 A1* | 4/2019 | Wind | B29C 63/341 |

OTHER PUBLICATIONS

Blocher J., Browning M., & Barrett D. (1984). Chemical Vapor Deposition of Ceramic Materials. In: Davis R., Palmour H., & Porter R. (eds) Emergent Process Methods for High-Technology Ceramics. Materials Science Research, vol. 17. Springer: Boston, MA. doi: https://doi.org/10.1007/978-1-4684-8205-8_23.

(Continued)

*Primary Examiner* — Toan C Ly
(74) *Attorney, Agent, or Firm* — Armstrong Teasdale LLP

(57) ABSTRACT

A radio-frequency identification ("RFID") device includes a substrate and a load formed in the substrate, where the load includes at least one microchannel and at least one body of fusible metal contained within the at least one microchannel. The RFID device also includes an antenna electrically connected to the load, and a protective layer covering at least a portion of the substrate.

20 Claims, 8 Drawing Sheets

(56) References Cited

OTHER PUBLICATIONS

Eustathopoulos, N. (2015). Wetting by Liquid Metals—Application in Materials Processing: The Contribution of the Grenoble Group. Metals, 5, 350-370. doi:10.3390/met5010350.
Yarris, K. (Dec. 13, 2010). Tiny Channels Carry Big Information. Retrieved from website http://newscenter.lbl.gov/2010/12/13/tiny-channels-carry-big-information/.

* cited by examiner

RADIO-FREQUENCY IDENTIFICATION DEVICE FOR INDICATING A TEMPERATURE HISTORY OF A COMPOSITE STRUCTURE

FIELD

The field of the disclosure relates generally to a radio-frequency identification (RFID) device, and more particularly to an RFID device configured to be placed in a composite structure to indicate a temperature history of the composite structure.

BACKGROUND

A variety of mechanical structures, such as airframe structures, are manufactured by laying up a plurality of composite plies, infusing the plies with a curable resin, and heating the resin-infused plies to a predefined curing temperature, such as, for example, within a heating bag or autoclave.

Traditionally, the curing process is monitored using one or more thermocouples inserted or embedded in the resin-infused plies. When the manufacturing process is complete, however, it is commonly necessary that these thermocouples, embedded throughout the composite structure, be removed. Removal, in turn, may result in a plurality of interspaced voids, each of which may require patching during a post-production repair phase.

Many such thermocouples are also incapable of verifying, post hoc, that a maximum curing temperature was not exceeded during the curing process. Conventional thermocouples are likewise typically unable to indicate a temperature history of a composite structure. Rather, conventional thermocouples may only be useful for monitoring a curing temperature during the curing process itself, and cannot be examined later to verify a maximum curing temperature and/or temperature history.

This Background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a radio-frequency identification (RFID) device is provided. The RFID device includes a substrate and a load formed in the substrate, where the load includes at least one microchannel and at least one body of fusible metal contained within the at least one microchannel. The RFID device also includes an antenna electrically connected to the load, and a protective layer covering at least a portion of the substrate.

In another aspect, a composite structure is provided. The composite structure includes at least a first layer and a second layer of composite material infused with a curable resin, and at least one radio-frequency identification (RFID) device embedded between the first layer and the second layer. The RFID device includes a substrate, a load including at least one microchannel and at least one body of fusible metal contained within the at least one microchannel, and an antenna electrically connected to the load.

In yet another aspect, a method of manufacturing a composite structure is provided. The method includes laying up a plurality of plies, embedding at least one radio-frequency identification (RFID) device between at least a first ply and a second ply of the plurality of plies, where the RFID device configured to indicate a temperature history of the composite structure, and infusing the plurality of plies with a resin. The method also includes heating the resin infused plies to cure the resin, and receiving temperature data from the RFID device to control the curing.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a radio-frequency identification (RFID) device are described. For example, embodiments of an RFID device configured to be placed in a composite structure during curing of the composite structure for the purpose of indicating a temperature history of the composite structure are described. In various embodiments, the RFID device includes a load that may take a variety of forms, and that may be configured to change state as the composite structure is cured. For example, the load may include one or more microchannels, such as one or more microchannels formed in a substrate of the RFID device, each of which may contain a solid body of fusible metal. As the RFID device is heated within the composite structure, the body of fusible metal may change state, such as from solid to liquid, and flow within the microchannel to complete a circuit (e.g., a resistive or capacitive circuit) within the RFID device. In some embodiments, different volumes of fusible metal may be included in different microchannels to control a rate of melting. Similarly, different metals having different melting temperatures may be used to control a temperature at which each circuit is completed. The completed circuit may, in turn, indicate that a predefined temperature (or a plurality of predefined temperatures) have been achieved during the curing process.

Figure 1:
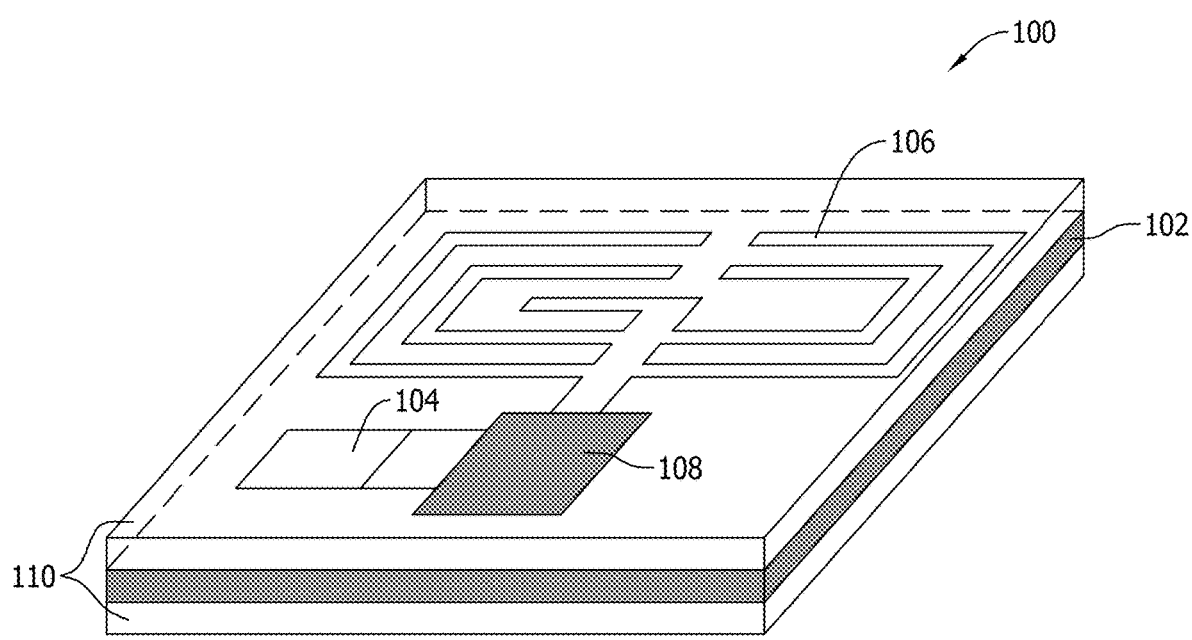
FIG. 1 is a perspective view of an example radio-frequency identification (RFID) device configured to be placed in a composite structure to indicate a temperature history of the composite structure.

FIG. 1 is a perspective view of an example radio-frequency identification (RFID) device 100 configured to be placed in a composite structure to indicate a temperature history of the composite structure. In an example embodiment, RFID device 100 includes a substrate 102, a load 104, an antenna 106, an integrated circuit 108, and a protective layer 110.

Technical effects of RFID device 100 include, for example: (a) indicating a temperature history of a composite structure in which RFID device 100 is embedded, such as during a curing process of the composite structure; (b) indicating a current temperature of the composite structure; (c) enabling temperature monitoring and careful temperature control of the composite structure during curing; (d) an improved composite structure manufacturing process that does not necessitate removal of the RFID device post-manufacture; (e) wireless communication of a temperature history and/or one or more instantaneous temperature measurements to an RFID reader during and/or post-manufacture; and (0 validation that a predefined maximum curing temperate was not exceeded during curing.

Substrate 102 may include a planar structure of any suitable shape, such as, for example, a rectangular, square, or circular shape. In one embodiment, substrate 102 may include any substrate suitable for supporting a printed circuit, such as any non-conductive or semi-conductive substrate (e.g., silicon) capable of supporting or including one or more conductive tracks or etches. In one implementation, substrate 102 may be small, such as approximately 150 microns square. One technical effect of substrate 102 may include, as described herein, facilitating fabrication or formation of one or more loads therein, where each load, in turn, facilitates measurement of a temperature history of RFID device 100 and/or a composite structure in which RFID device 100 is embedded.

Load 104 is coupled to, printed on, or formed in substrate 102 and may include any of a variety of structures capable of restructuring and/or changing state when heated. In one embodiment, load 104 includes a parallel resistive load that changes resistance depending upon a temperature experienced. An example parallel resistive load is shown and described in greater detail with reference to FIG. 2 and FIG. 3 below. Several alternative embodiments of load 104 are also shown and described with respect to FIG. 4 and FIG. 5 below. One technical effect of load 104 may include facilitating measurement, as described in greater detail herein, of a temperature history of RFID device 100 and/or a composite structure in which RFID device 100 is embedded.

Antenna 106 is coupled to, printed on, or formed in substrate 102 and may include any of a variety of radio-frequency ("RF") antennas. For example, in one embodiment, antenna 106 may include a conductive pattern printed on a surface of substrate 102, using, for example, silver paste. In the example embodiment, antenna 106 may be electrically connected to load 104 and/or integrated circuit 108. It will further be appreciated that antenna 106 may include a variety of known shapes and/or patterns and that the specific pattern implemented is not central to an understanding of the present disclosure. One technical effect of antenna 106 may include that antenna 106 facilitates or enables wireless transmission of one or more temperature measurements or temperature history data from RFID device 100 to an RFID reader.

Integrated circuit 108 is coupled to, printed on, or formed in substrate 102 and may, in various embodiments, include any suitable RFID integrated circuit (or "RFID chip"). In some embodiments, integrated circuit 108 is a basic controller or microcontroller. However, in other embodiments, integrated circuit 108 may include a more simplified control structure, such as, for example, an integrated circuit capable of modulating a voltage on antenna 106. In the example embodiment, integrated circuit may be electrically connected to load 104 and/or antenna 106. For example, in at least one embodiment, integrated circuit 108 is electrically connected between load 104 and antenna 106. Here again, it will be appreciated that integrated circuit 108 may include a variety of known integrated circuits or RFID chips and that the specific integrated circuit or RFID chip implemented is not central to an understanding of the present disclosure.

Technical effects of integrated circuit 108 may include, as described herein, enabling temperature monitoring and careful temperature control of the composite structure during curing, controlling antenna 106 to wirelessly communicate a temperature history and/or one or more instantaneous temperature measurements to an RFID reader during and/or post-manufacture, and facilitating verification that a predefined maximum curing temperate was not exceeded during curing.

Further, in at least some embodiments, RFID device 100 excludes integrated circuit 108, because for example, it may not be necessary to include an independent control structure for modulating a voltage on antenna 106. Rather, in at least some embodiments, a voltage on antenna 106 may be modulated purely by a resistive, capacitive, and/or inductive response of load 104. Thus, in some embodiments, antenna 106 may be directly electrically connected to load 104. However, in other embodiments, integrated circuit 108 may be electrically connected between load 104 and antenna 106.

Protective layer 110 may partially or completely surround substrate 102, including load 104, antenna 106, and/or integrated circuit 108 to shield these components from environmental factors. In various embodiments, protective layer 110 may thus include any non-conductive or semi-conductive material, such, as, for example, any plastic or polymer material. As such, one technical effect of protective layer 110 is protection of RFID device 100 from a variety of environmental factors or contaminants, including, for example, from a resin infused in a composite structure during manufacture of a composite structure.

Figure 2:
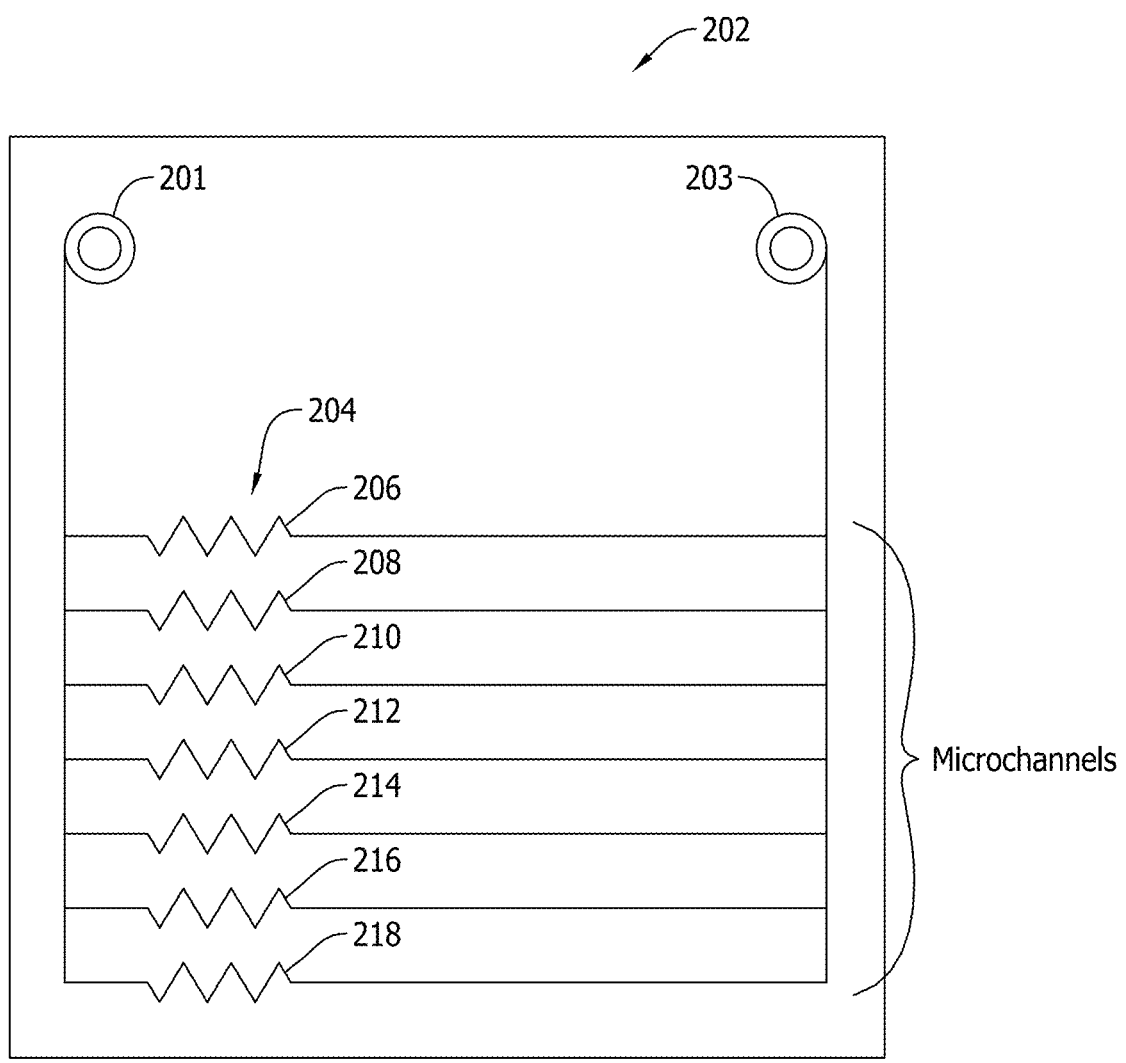
FIG. 2 is a circuit diagram of an example parallel resistive load of the RFID device shown in FIG. 1.
Figure 3:
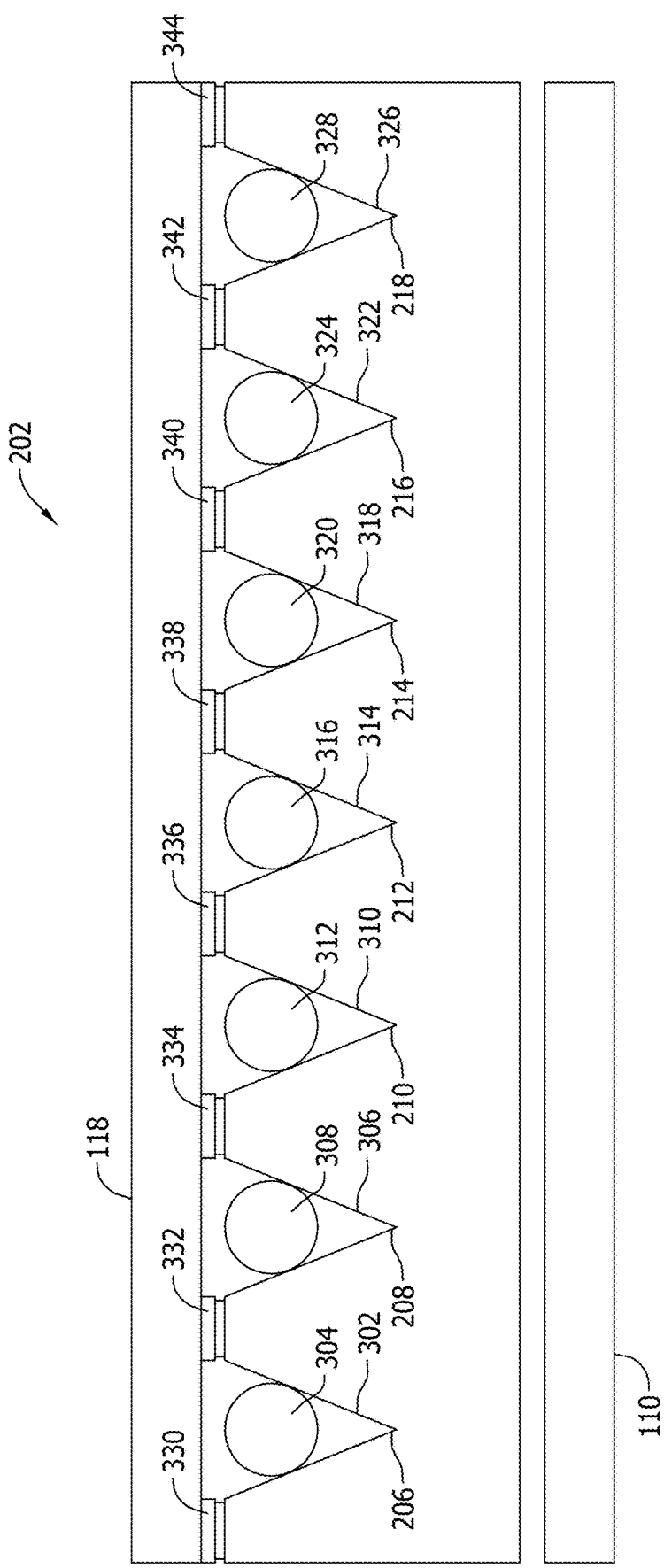
FIG. 3 is a cross-sectional view of the parallel resistive load shown in FIG. 2.

FIG. 2 is a circuit diagram of an example load 202. Specifically, FIG. 2 illustrates a parallel resistive load 202. FIG. 3 is a cross-sectional view of parallel resistive load 202.

Accordingly, with reference to FIG. 2, parallel resistive load 202 may include a plurality of resistive elements 204, such as one or more microchannel resistors, as described below, coupled in parallel between an input lead 201 and an output lead 203. In the example shown at FIG. 2, load 202 includes a first resistive element 206, a second resistive element 208, a third resistive element 210, a fourth resistive element 212, a fifth resistive element 214, a sixth resistive element 216, and a seventh resistive element 218. However, any suitable number of resistive elements 204 may be implemented. Resistive elements 206-218 are merely representative of one example parallel resistive load 202. Other parallel resistive loads 202 may include other numbers (e.g., greater or fewer) numbers of parallel resistive elements 204. Further, as described herein, resistive elements 204 may be configured to change state when heat is applied, such as from an open circuit or non-conducting state to a closed circuit, conducting, state.

Technical effects of resistive elements 204 may include, for example, facilitating accurate temperature measurements, both post-production as temperature history data as well as during production as one or more instantaneous temperature readings or measurements.

Referring to FIG. 3, structurally, each resistive element 206-218 may include a microchannel and a body of fusible metal within the microchannel. For example, first resistive element 206 may include a first microchannel 302 and a first body of fusible metal 304, second resistive element 208 may include a second microchannel 306 and a second body of fusible metal 308, third resistive element 210 may include a third microchannel 310 and a third body of fusible metal 312, fourth resistive element 212 may include a fourth microchannel 314 and a fourth body of fusible metal 316, fifth resistive element 214 may include a fifth microchannel 318 and a fifth body of fusible metal 320, sixth resistive element 216 may include a sixth microchannel 322 and a sixth body of fusible metal 324, and seventh resistive element 218 may include a seventh microchannel 326 and a seventh body of fusible metal 328. As described above, however, any suitable number of resistive elements 204, each comprising a microchannel and body of fusible metal, may be implemented. Each body of fusible metal 304-328 may, when melted within a microchannel, function as a resistor within a respective microchannel 302-326.

Similarly, in at least some embodiments, each resistive element 206-218 may include a microchannel 302-326, a body of fusible metal 304-328, and a separate resistor capable of being electrically connected when a body of fusible metal 304-328 melts within a respective microchannel 302-326. In such an embodiment, as described herein, when a body of fusible metal 304-328 melts within a respective microchannel 302-326, a circuit may be completed to connect a respective resistor may between input lead 201 and output lead 203. However, as described herein, a separate resistor is not required, as each body of fusible metal 304-328 may itself include a resistance when fused between input lead 201 and output lead 203.

In at least one example embodiment, microchannels 302-326 may be formed in substrate 102. For instance, microchannels 302-326 may include troughs or furrows formed or etched in substrate 102. In some embodiments, microchannels 302-326 may be formed or etched using any known lithographic fabrication technique, such as photolithography, and the like. Further, one or more flexible cushions 330-342 (e.g., rubber or polymer cushions) may be inserted, as shown, between substrate 102 and protective layer 110, such as to flexibly accommodate expansion of one or more bodies of fusible metal 304-328 within each respective microchannel 302-326 and sealing microchannels 302-326 from each other. However, in other embodiments, cushions 330-342 are excluded.

Each body of fusible metal 304-328 may include any body of metal that is solid or substantially solid at room temperature and that is capable of melting in a temperature range used to cure a composite structure. In some embodiments, first body of fusible metal 304 may have a first melting temperature, such as, for example, a temperature approximately equal to an initial temperature of a curing process (e.g., 280 degrees Fahrenheit). Likewise, second body of fusible metal 308 may have a second melting temperature greater than the first melting temperature (e.g., by 10-20 degrees Fahrenheit), third body of fusible metal 312 may have a third melting temperature greater than the second melting temperature (e.g., by 10-20 degrees Fahrenheit), fourth body of fusible metal 316 may have a fourth melting temperature greater than the third melting temperature (e.g., by 10-20 degrees Fahrenheit), fifth body of fusible metal 320 may have a fifth melting temperature greater than the fourth melting temperature (e.g., by 10-20 degrees Fahrenheit), sixth body of fusible metal 324 may have a sixth melting temperature greater than the fifth melting temperature (e.g., by 10-20 degrees Fahrenheit), and seventh body of fusible metal 328 may have a seventh melting temperature greater than the sixth melting temperature (e.g., by 10-20 degrees Fahrenheit).

Thus, in general, each body of fusible metal 304-328 may be selected (e.g., during design or manufacture of RFID device 100) to melt at a temperature greater than a body of fusible metal 304-328 contained in a preceding microchannel 302-326. To this end, each body of fusible metal 304-328 may be different from one or more other bodies of fusible metal 304-328 and may include a different type or composition of metal, such as, to achieve a range of melting temperatures.

The range of melting temperatures may, in addition, correspond to a range of curing temperatures using in curing a composite structure, such that, during the curing process, at least body of fusible metal 304-328 melts within a respective microchannel 302-326. In other words, each respective body of fusible metal 304-328 may have a melting temperature in a range of melting temperatures, where the range of melting temperatures corresponds to a temperature range of a curing process of a composite structure.

In some embodiments, some bodies of fusible metal 304-328, such as first through sixth bodies of fusible metal 304-324, may be selected based upon their respective melting temperatures, such that first through sixth bodies 304-324 are arranged to melt during a curing process, while seventh body 328 remains solid. In other embodiments, fewer than six bodies of fusible metal 304-324 may be arranged to reach a melting temperature and/or all seven bodies of fusible metal 304-328 may be selected, based upon physical properties such as melting temperature, to melt during a curing process.

In operation, and as described in greater detail below, RFID device 100 may be placed in an uncured composite structure (e.g., during lay-up of the structure), and heated through a range of temperatures corresponding to a curing process of the composite structure. As RFID device 100 is gradually heated, one or more bodies of fusible metal 304-328 may melt and flow within a respective microchannel 302-326.

As a body of fusible metal 304-328 melts and flows in a respective microchannel 302-326, the body of fusible metal 304-328 may lengthen and/or expand within the microchannel 302-326 to fuse or electrically connect input lead 201 to output lead 203, thereby completing a portion or leg of parallel resistive load 202. Specifically, each time a fusible body of metal 304-328 melts within a microchannel 302-326 to connect input lead 201 to output lead 203, a circuit corresponding to a resistive element 206-218 may be formed, created, or otherwise completed between input lead 201 and output lead 203. Similarly, as described above, in the case that an independent resistor is included in each resistive element 206-218, each body of fusible metal 304-328 may melt to connect a respective resistor between input lead 201 and output lead 203. In either case, a total resistance of parallel resistive load 202 may vary as each body of fusible metal 304-328 melts within a respective microchannel 302-326.

Stated another way, prior to melting a respective body of fusible metal 304-328, a corresponding resistive element 206-218 may function as an open circuit in parallel resistive load 202. Thus, resistive elements 204, including microchannels 302-326 and bodies of fusible metal 304-328, are configured to change state when heat is applied, such as from a solid non-conducting state prior to melting of a respective body of fusible metal 304-328 to a liquid conducting state when the body of fusible metal 304-328 melts. Accordingly, microchannels 302-326 collectively form an electrical circuit having a resistance that is dependent upon a state of each respective body of fusible metal 304-328 included in each microchannel 302-326. As described in additional detail herein, once a body of fusible metal 304-328 melts within a respective microchannel 302-326, the circuit created may remain, even after RFID device 100 cools.

Thus, as each body of fusible metal 304-328 melts within a respective microchannel 302-326, a circuit of each resistive element 206-218 is completed, and a total resistance of parallel resistive load 202 decreases. Specifically, it will be appreciated that resistors connected in parallel result in a lower total resistance of a parallel connected circuit. Thus, greater temperatures experienced by parallel resistive load 202 result in an incrementally decreasing total resistance of load 202 as each body of fusible metal 304-328 is successively melted. As described in greater detail below, the total resistance of load 202 may be used to determine a temperature history of RFID device 100.

Technical effects of microchannels 302-326 and bodies of fusible metal 304-328 may include, for example, facilitating accurate temperature measurements, both post-production as temperature history data as well as during production as one or more instantaneous temperature readings or measurements.

Figure 4:
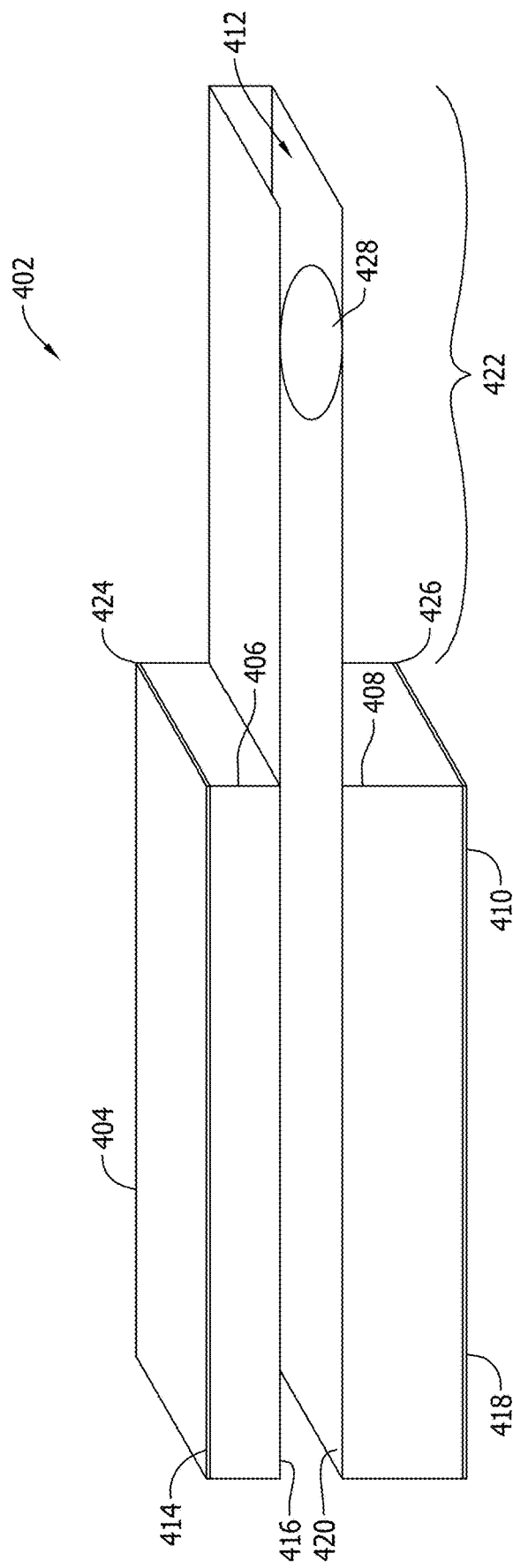
FIG. 4 is a perspective view of an alternative embodiment that includes an example capacitive load for use in the RFID device shown in FIG. 1.

FIG. 4 is a perspective view of an alternative embodiment of load 104. Specifically, in the embodiment shown at FIG. 4, a capacitive load 402 is illustrated.

In the example embodiment, capacitive load 402 includes a first conductive plate 404, a first dielectric 406, a second dielectric 408, a second conductive plate 410, and a dielectric microchannel 412. More particularly, first dielectric 406 may include an outer surface 414 and an inner surface 416, and second dielectric 408 may likewise include an outer surface 418 and an inner surface 420. First conductive plate 404 may be coupled to outer surface 414 of first dielectric 406, and second conductive plate 410 may be coupled to outer surface 418 of second dielectric 408.

Further, inner surface 416 of first dielectric 406 may be spaced apart from inner surface 420 of second dielectric 408 to form a gap therebetween, and dielectric microchannel 412 may extend at least partially within the gap between inner surface 416 of first dielectric 406 and inner surface 420 of second dielectric 408. In the example embodiment, at least a portion 422 of dielectric microchannel 412 may extend beyond an edge 424 of first conductive plate 404 and/or an edge 426 of second conductive plate 410. A body of fusible metal 428 may be contained within dielectric microchannel 412, such as, for example, within portion 422 of dielectric microchannel 412.

In operation, capacitive load 402 may be heated, as described herein, during a curing process of a composite structure within which load 402 is placed. During heating, body of fusible metal 428 may melt and flow within microchannel 412 to enter, within microchannel 412, between first conductive plate 404 and second conductive plate 410. As body of fusible metal 428 enters between plates 404 and 410, the structure of load 402 may be altered, such that load 402 becomes capable of conducting as a capacitor. Once load 402 is conducting, it may be determined, as described herein, that a melting temperature associated with body of fusible metal 428 has been reached or exceeded.

Technical effects of load 402 include facilitating accurate temperature measurements, both post-production as temperature history data as well as during production as one or more instantaneous temperature readings or measurements.

Figure 5:
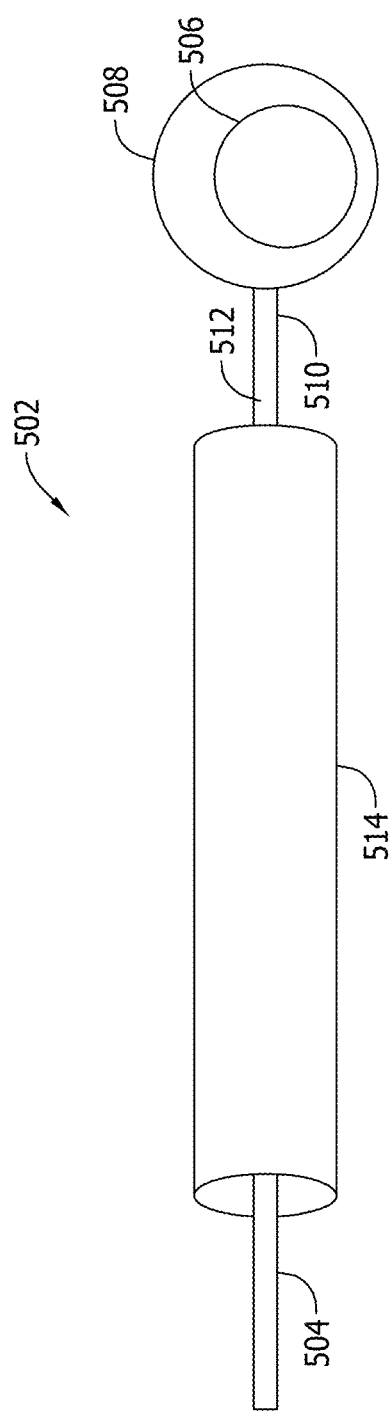
FIG. 5 is a perspective view of another alternative embodiment that includes an example capacitive load for use in the RFID device shown in FIG. 1.

FIG. 5 is a perspective view of another alternative embodiment of load 104. Specifically, in the embodiment shown at FIG. 5, a capacitive load 502 is illustrated.

In the example embodiment, capacitive load 502 generally includes a metallophobic tubular structure 504 that contains a body of fusible metal 506. More particularly, capacitive load 502 includes a bulb 508 at least partially filled with the at least one body of fusible metal 506 and a stem 510 extending from the bulb 508, where stem 510 is a hollow tubular structure that defines a microchannel 512 therein. In the example embodiment, stem 510 is also at least partially surrounded by a conductive metal jacket 514. In one embodiment, jacket 514 is a thin layer of a conductive metal, such as copper or aluminum. Likewise, in at least one embodiment, metallophobic tubular structure 504 is a glass, such as, for example, floated borosilicate glass.

In operation, capacitive load 502 may be heated, as described herein, during a curing process of a composite structure within which load 502 is placed. During heating, body of fusible metal 506 may melt and expand from bulb 508 some distance into stem 510 within microchannel 512 to enter, within microchannel 512, a region of stem 510 surrounded by conductive metal jacket 514. In at least some embodiments, the distance within stem 510 into which body of fusible metal 506 expands may be dependent upon temperature, a coefficient of expansion, and/or a diameter of stem 510. Similarly, as the temperature decreases, the metallophobic nature of stem 510 may cause or facilitate receding of body of fusible metal 506 within stem 510 towards bulb 508. As a result, capacitive load 502 may be thought of, in some aspects, as a sort of thermometer, except that temperature may be measured by a change in capacitance rather than by visual means.

Technical effects of load 502 include facilitating accurate temperature measurements, both post-production as temperature history data as well as during production as one or more instantaneous temperature readings or measurements.

Figure 6:
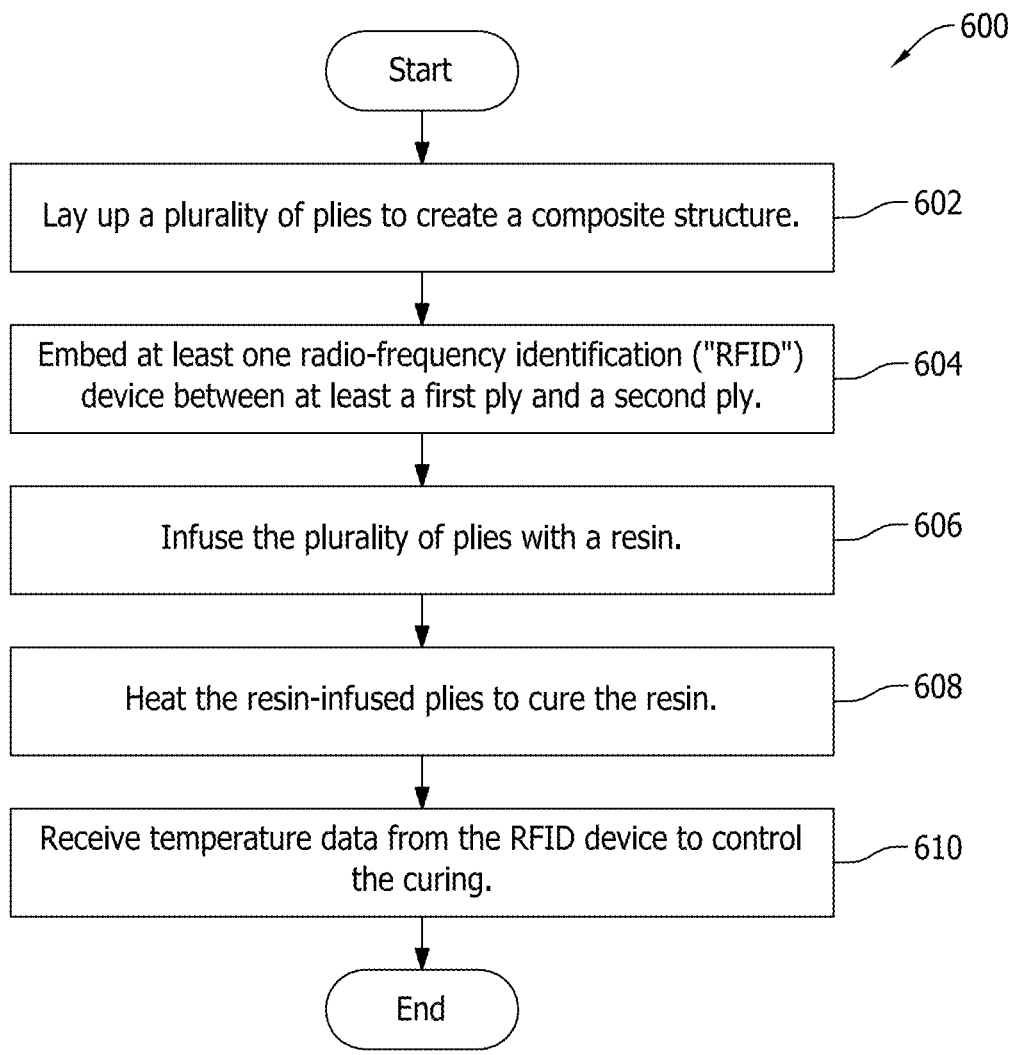
FIG. 6 is a flowchart illustrating a process of manufacturing a composite structure that includes one or more RFID devices shown in FIG. 1.
Figure 7:
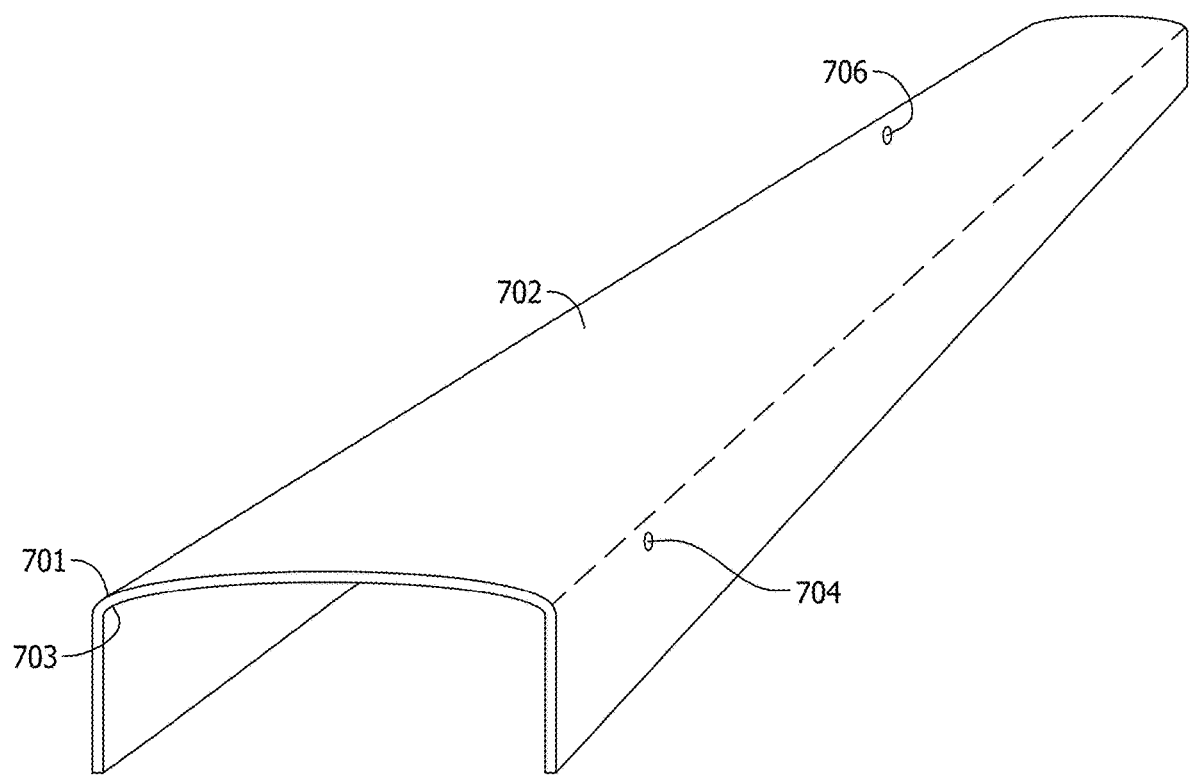
FIG. 7 is a perspective view of an example composite structure embedded with a plurality of RFID devices, as shown in FIG. 1.

FIG. 6 is a flowchart illustrating a process 600 of manufacturing a composite structure that includes one or more RFID devices, such as RFID device 100. FIG. 7 is a perspective view of an example composite structure 702 embedded with a plurality of RFID devices. Specifically, composite structure 702 is embedded with a first RFID device 704 and a second RFID device 706. It will be appreciated, however, that composite structure 702 may, in practice, be embedded with any suitable number of RFID devices, such as, for example, tens, hundreds, or thousands of such RFID devices.

Referring to FIG. 6 and FIG. 7, to manufacture composite structure 702, a plurality of plies may be initially laid up or stacked, on atop another (step 602). For example, in a simplified example, an upper ply 701 and a lower ply 703 may be laid up. As those of skill will appreciate, the plies may include a variety of materials. Commonly, plies may include sheets of fibrous material, and each ply may be stacked atop another ply so that the fibers of one ply run in a direction different from the fibers of an adjacent ply.

During lay-up, one or more RFID devices 100, such as RFID devices 704 and 706, may be embedded or inserted between one or more layers of composite structure 702 (step 604). In some embodiments, RFID devices 100 may be embedded at a common depth or layer within composite structure 702. In another embodiment, RFID devices 100 may be embedded at different depths or between different plies of composite structure 702.

In some embodiments, each location of an RFID device 704 and 706 may be indicated for ease of locating each RFID device 704 and 706 during and/or after a curing process, as described below. A variety of techniques may be used to indicate each RFID device 704 and 706. For example, in at least one embodiment, a location of each RFID device 704 and 706 within composite structure may be indicated by painting or staining composite structure 702 at each RFID device location.

Once composite structure 702 is embedded with one or more RFID devices 100 (e.g., RFID devices 704 and 706), the plies of composite structure 702 may be infused, using a variety of known techniques, with a curable resin (step 606). The resin-infused plies may, in addition, be heated, such as within a heating bag or autoclave, to cure the resin (step 608). In some embodiments, the resin may cure in a temperature range of approximately 280 degrees Fahrenheit to 350 degrees Fahrenheit. Thus, composite structure 702 may be heated through an appropriate temperature range, such as the range provided above, until the resin is properly cured.

During the curing process, an RFID reader, as described in additional detail below, may receive temperature data from each RFID device 704 and 706 embedded in composite structure 702 (step 610). For example, a technician or operator may individually scan each embedded RFID device 704 and 706 within a composite structure, during and/or after curing, to obtain temperature information from each RFID device 704 and 706. For instance, in one embodiment, each RFID device 704 and/or 706 may transmit data indicative of a highest temperature experienced by the RFID device 704 and/or 706 to an RFID reader arranged to communicate, as described below, with the RFID device 704 and/or 706.

Similarly, in some embodiments, RFID devices 704 and/or 706 may be used to monitor a temperature of composite structure 702 during a curing process. For example, composite structure 702 may be heated to a first temperature (e.g., 280 degrees Fahrenheit), and a technician may scan one or more RFID devices 704 and/or 706 to obtain a first temperature measurement corresponding to a current temperature of composite structure 702. If the first temperature measurement indicates that composite structure 702 has not reached a predefined curing temperature, the technician may increase the temperature of composite structure 702 (e.g., within a heating bag or autoclave), and this process of measurement and temperature adjustment may continue until a predefined curing temperature is achieved.

Similarly, in at least some embodiments, one or more RFID devices 100, such as RFID devices 704 and/or 706, may be scanned post hoc, after a curing process is complete, to verify that the curing process did not exceed a maximum curing temperature. Specifically, because, after curing, the fusible metal of the RFID device (as described in various embodiments above) will re-solidify, the resistive or capacitive circuit formed by the fusible metal during curing will remain intact or preserved in the RFID device 100 after curing is complete.

Thus, if for example, it is desirable to verify that a curing process has not exceeded a predefined maximum curing temperature (or "predefined temperature"), a fusible metal may be included in the RFID device 100 that melts at the predefined temperature. If the predefined temperature is reached or exceeded, the fusible metal will melt within RFID device 100, indicating that the predefined temperature was reached or exceeded. On the other hand, if the fusible metal does not melt during a curing process, the RFID device 100 may indicate that the predefined temperature was not reached or exceeded. Thus, in at least some embodiments, an RFID device 100 may be embedded to verify that a predefined maximum curing temperature is not reached or exceeded during a curing process.

Technical effects of RFID devices 704 and/or 706 may thus include, for example, (a) indicating a temperature history of composite structure 702; (b) indicating a current temperature of composite structure 702; (c) enabling temperature monitoring and careful temperature control of composite structure 702 during curing; (d) an improved composite structure manufacturing process that does not necessitate removal of RFID devices 704 and/or 706 post-manufacture; (e) wireless communication of a temperature history and/or one or more instantaneous temperature measurements to an RFID reader during and/or post-manufacture; and (0 validation that a predefined maximum curing temperate was not exceeded during curing.

Figure 8:
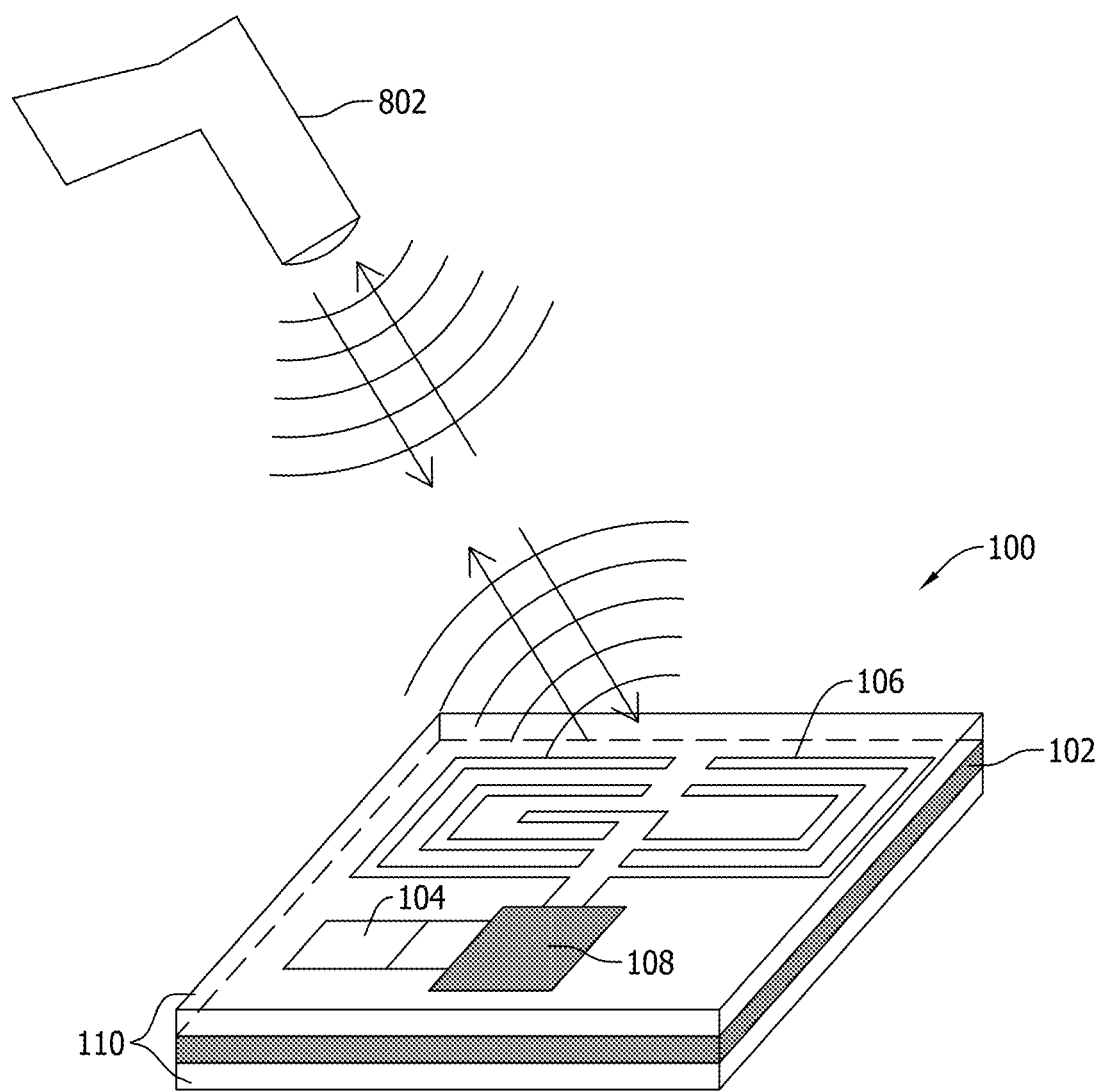
FIG. 8 is a schematic view of an example RFID reader communicating with the RFID device shown in FIG. 1.

FIG. 8 is a schematic view of an example RFID reader 802 communicating with an RFID device 100. For example, RFID reader 802 may communicate with RFID devices 704 and/or 706 embedded in composite structure 702, as described above.

For example, RFID reader 802 may induce an electromagnetic field in each RFID device 704 and/or 706 when a technician brings RFID reader 802 near (e.g., within a predefined distance) of each RFID device 704 and/or 706. In response, each RFID device 704 and/or 706 may respond with temperature data of each RFID device 704 and/or 706. For instance, in some embodiments, each RFID device 704 and/or 706 may respond with a voltage or voltage modulated signal that indicates a highest temperature experienced by the RFID device 704 and/or 706.

As described herein, integrated circuit 108 may modulate the signal response based upon a number of resistive elements 206-218 melted and fused in resistive load 202 and/or, in other embodiments, based upon a capacitive response of capacitive loads 402 and/or 502. Specifically, integrated circuit 108 may transmit a wireless signal to RFID reader 802 based upon a resistance and/or capacitance of a load 202, 402, and/or 502. In other embodiments, integrated circuit 108 may be excluded from an RFID device 704 and/or 706 (as described above), and a passive response of RFID device 704 and/or 706 (as modified or affected by a solid or melted state of load 202, 402, and/or 502) to the induced electromagnetic field may serve to indicate a temperature history, such as a highest temperature experienced and/or a current temperature, of the RFID device 704 and/or 706.

Technical effects of RFID reader 802 may thus include, for example, receiving temperature history data and/or receiving one or more instantaneous temperature readings. Another technical effect of RFID reader 802 may including displaying or otherwise facilitating presentation of received temperature data to a technician during and/or after a curing process.

Accordingly, a radio-frequency identification ("RFID") device is described. More particularly, an RFID device configured to be placed in a composite structure during curing of the composite structure for the purpose of indicating a temperature history of the composite structure is described. In various embodiments, the RFID device includes a load, which may take a variety of forms, and which may be configured to change state as the composite structure is cured. For example, the load may include one or more microchannels, such as one or more microchannels formed in a substrate of the RFID device, each of which may contain a solid body of fusible metal. As the RFID device is heated within the composite structure, the body of fusible metal may change state, such as from solid to liquid, and flow within the microchannel to complete a circuit (e.g., a resistive or capacitive circuit) within the RFID device. The completed circuit may, in turn, indicate that a predefined temperature (or a plurality of predefined temperatures) have been achieved during the curing process.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one embodiment" of the present disclosure or "an example embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radio-frequency identification ("RFID") device for placement in a composite structure during a curing process comprising:
   a substrate;
   a load formed in the substrate, the load including at least one microchannel and at least one body of fusible metal contained within the at least one microchannel, wherein the fusible metal is configured to melt and alter an electrical characteristic of the load proportional to a temperature applied to the composite structure during the curing process;
   an antenna electrically connected to the load; and
   a protective layer covering at least a portion of the substrate.

2. The RFID device of claim 1, further comprising an integrated circuit on the substrate, the integrated circuit electrically connected to the load and the antenna, the integrated circuit configured to transmit a wireless signal to an RFID reader based upon a resistance of the load.

3. The RFID device of claim 1, wherein the load further comprises a conductive plate and a dielectric, the at least one microchannel separated from the conductive plate by the dielectric.

4. The RFID device of claim 1, wherein the load further comprises a metallophobic structure including a bulb at least partially filled with the at least one body of fusible metal and a stem extending from the bulb, the stem defining the at least one microchannel, the stem at least partially surrounded by a conductive metal jacket.

5. The RFID device of claim 1, wherein the load further comprises a plurality of microchannels, each microchannel of the plurality of microchannels including a respective body of fusible metal.

6. The RFID device of claim 5, wherein each respective body of fusible metal comprises a different fusible metal having a different melting temperature.

7. The RFID device of claim 6, wherein each respective body of fusible metal has a melting temperature in a range of melting temperatures, the range of melting temperatures corresponding to a temperature range of a curing process of a composite structure.

8. The RFID device of claim 5, wherein the plurality of microchannels collectively form an electrical circuit having a resistance that is dependent upon a state of each respective body of fusible metal included in each microchannel of the plurality of microchannels.

9. The RFID device of claim 1, wherein the RFID device is configured to transmit data indicating a highest temperature experienced by the RFID device to an RFID reader arranged to communicate with the RFID device.

10. The RFID device of claim 1, wherein a passive response of the RFID device to an inductive signal received from an RFID reader is modified by a state of the at least one body of fusible metal.

11. A composite structure comprising:
    at least a first layer and a second layer of composite material infused with a curable resin; and
    at least one radio-frequency identification ("RFID") device embedded between the first layer and the second layer, the at least one RFID device comprising:
       a substrate;
       a load including at least one microchannel and at least one body of fusible metal contained within the at least one microchannel, wherein the fusible metal is configured to melt and alter an electrical characteristic of the load proportional to a temperature applied to the composite structure during a curing process of the composite structure; and
       an antenna electrically connected to the load.

12. The composite structure of claim 11, wherein the RFID device further comprises an integrated circuit on the substrate, the integrated circuit electrically connected to the load and the antenna, the integrated circuit configured to transmit a wireless signal to an RFID reader based upon a resistance of the load.

13. The composite structure of claim 11, wherein the load further comprises a plurality of microchannels formed in the substrate, each microchannel of the plurality of microchannels including a respective body of fusible metal.

14. The composite structure of claim 13, wherein each respective body of fusible metal comprises a different fusible metal having a different melting temperature.

15. The composite structure of claim 14, wherein each respective body of fusible metal has a melting temperature in a range of melting temperatures, the range of melting temperatures corresponding to a temperature range of a curing process of the composite structure.

16. The composite structure of claim 13, wherein the plurality of microchannels collectively form an electrical circuit having a resistance that is dependent upon a state of each respective body of fusible metal included in each microchannel of the plurality of microchannels.

17. The composite structures of claim 11, wherein a passive response of the RFID device to an inductive signal received from an RFID reader is modified by a state of the at least one body of fusible metal.

18. A method of manufacturing a composite structure, the method comprising:
    laying up a plurality of plies;
    embedding at least one radio-frequency identification ("RFID") device between at least a first ply and a second ply of the plurality of plies, the RFID device configured to indicate a temperature history of the composite structure, the RFID device comprising a load including at least one microchannel and at least one body of fusible metal contained within the at least one microchannel;
    infusing the plurality of plies with a resin;
    heating the resin infused plies to cure the resin, the heating also causing the fusible metal of the RFID device to melt and alter an electrical characteristic of the load of the RFID device proportional to the heating; and
    receiving temperature data from the RFID device to control the curing.

19. The method of claim 18, further comprising:
    heating the resin infused plies to a first temperature;
    receiving, from the RFID device, a first temperature measurement; and
    heating the resin infused plies to a second, higher, temperature if the first temperature measurement indicates that a temperature of the RFID device is below a predefined curing temperature.

20. The method of claim 18, further comprising:
    validating, based upon a resistance of the RFID device and after the curing is complete, that the RFID device has not experienced a temperature in excess of a maximum curing temperature.

* * * * *